(12) United States Patent
Rudolph et al.

(10) Patent No.: US 12,153,023 B2
(45) Date of Patent: Nov. 26, 2024

(54) MIXED-DOMAIN ANALYSIS OF ULTRASONIC INSPECTION DATA

(71) Applicant: The Boeing Company, Chicago, IL (US)

(72) Inventors: Phillip D. Rudolph, Seattle, WA (US); Jill Paisley Bingham, Seattle, WA (US); Barry A. Fetzer, Renton, WA (US)

(73) Assignee: The Boeing Company, Arlington, VA (US)

( * ) Notice: Subject to any disclaimer, the term of this patent is extended or adjusted under 35 U.S.C. 154(b) by 491 days.

(21) Appl. No.: 17/453,034

(22) Filed: Nov. 1, 2021

(65) Prior Publication Data

US 2022/0146463 A1    May 12, 2022

Related U.S. Application Data

(60) Provisional application No. 63/112,886, filed on Nov. 12, 2020.

(51) Int. Cl.
*G01N 29/46* (2006.01)
*G01N 29/07* (2006.01)
*G01N 29/34* (2006.01)

(52) U.S. Cl.
CPC ............. *G01N 29/46* (2013.01); *G01N 29/07* (2013.01); *G01N 29/341* (2013.01); *G01N 2291/044* (2013.01)

(58) Field of Classification Search
CPC ...... G01N 29/46; G01N 29/07; G01N 29/341; G01N 29/42; G01N 29/12; G01N 29/4412; G01N 2291/044; G01N 2291/0289; G01N 2291/106
See application file for complete search history.

(56) References Cited

U.S. PATENT DOCUMENTS

| | | | |
|---|---|---|---|
| 2013/0047731 A1* | 2/2013 | Ume | G01N 29/2418 73/643 |
| 2020/0191754 A1* | 6/2020 | Findikoglu | G01N 29/223 |
| 2022/0065728 A1* | 3/2022 | Chang | G06N 3/045 |

* cited by examiner

*Primary Examiner* — Suman K Nath
(74) *Attorney, Agent, or Firm* — Alleman Hall & Tuttle LLP (57) ABSTRACT

A mixed-domain analysis method for evaluation of ultrasonic inspection data is disclosed. A return signal of an ultrasonic waveform applied to an article under inspection is received. The return signal is digitally processed to generate a mixed-domain spectrogram of the return signal. The mixed-domain spectrogram plots ranges of a frequency of the return signal, a time of flight of the return signal, and a power spectral density of the return signal. A data gate having ranges of frequency and time of flight that define an area of interest in the mixed-domain spectrogram is set. At least one of a material characteristic and an anomaly characteristic of the article under inspection is identified based on evaluating one or more time-frequency characteristics of the article under inspection in the area of interest.

20 Claims, 9 Drawing Sheets

MIXED-DOMAIN ANALYSIS OF ULTRASONIC INSPECTION DATA

CROSS REFERENCE TO RELATED APPLICATIONS

This application claims priority to U.S. patent application Ser. No. 63/112,886, filed Nov. 12, 2020, the entirety of which is hereby incorporated herein by reference for all purposes.

FIELD

This disclosure relates generally to ultrasonic testing of an article under inspection, and more specifically, to mixed-domain analysis of ultrasonic inspection data to identify characteristics of the article under inspection.

BACKGROUND

Nondestructive testing may use electromagnetic radiation, sound, or other types of signals to examine a wide variety of articles under inspection for integrity, composition, or condition with no alteration of the article being inspected. Because nondestructive testing does not permanently alter the structure of the article being inspected, such testing may reduce cost and time in product evaluation, troubleshooting, and research relative to other forms of inspection. As one example of nondestructive testing, ultrasonic inspection uses high frequency sound energy to detect internal flaws and to characterize materials of an article under inspection.

Current forms of ultrasonic inspection data analysis are typically limited to time-domain characterizations. However, for ultrasonic inspection data corresponding to articles that are relatively large and/or have relatively complex structural geometry, time-domain analysis alone may be unable to properly identify material characteristics or internal flaws of such articles.

SUMMARY

To address the above issues, according to one aspect of the present disclosure, a mixed-domain analysis method for evaluation of ultrasonic inspection data is disclosed. A return signal of an ultrasonic waveform applied to an article under inspection is received. The return signal is digitally processed to generate a mixed-domain spectrogram of the return signal. The mixed-domain spectrogram plots ranges of a frequency of the return signal, a time of flight of the return signal, and a power spectral density of the return signal. A data gate having ranges of frequency and time of flight that define an area of interest in the mixed-domain spectrogram is set. At least one of a material characteristic and an anomaly characteristic of the article under inspection is identified based on evaluating one or more time-frequency characteristics of the article under inspection in the area of interest.

The features and functions that have been discussed can be achieved independently in various embodiments or may be combined in yet other embodiments, further details of which can be seen with reference to the following description and drawings.

DETAILED DESCRIPTION

The present description is directed to mixed-domain analysis methods and associated systems for evaluation of ultrasonic inspection data. The herein described analysis methods leverage a mixed-domain spectrogram that is generated based on a return signal of an ultrasonic waveform applied to an article under inspection. The mixed-domain spectrogram plots ranges of a frequency of the return signal, a time of flight of the return signal, and a power spectral density of the return signal. One or more data gates are set in the spectrogram to define an area of interest. Time-frequency characteristics of the article under inspection are evaluated in the area of interest and a material characteristic and/or an anomaly characteristic of the article under inspection is identified based on such evaluations. By performing such evaluation on an area of interest in the mixed-domain spectrogram, a signal to noise ratio of the time-frequency characteristics may be increased relative to an analysis that is performed in the time domain alone. The increased signal to noise ratio produced by the mixed-domain analysis allows for material characteristics and anomaly characteristics of the article under inspection to be displayed with higher fidelity such that these characteristics can be more easily identified when processing or viewing the mixed-domain spectrogram.

Figure 1:
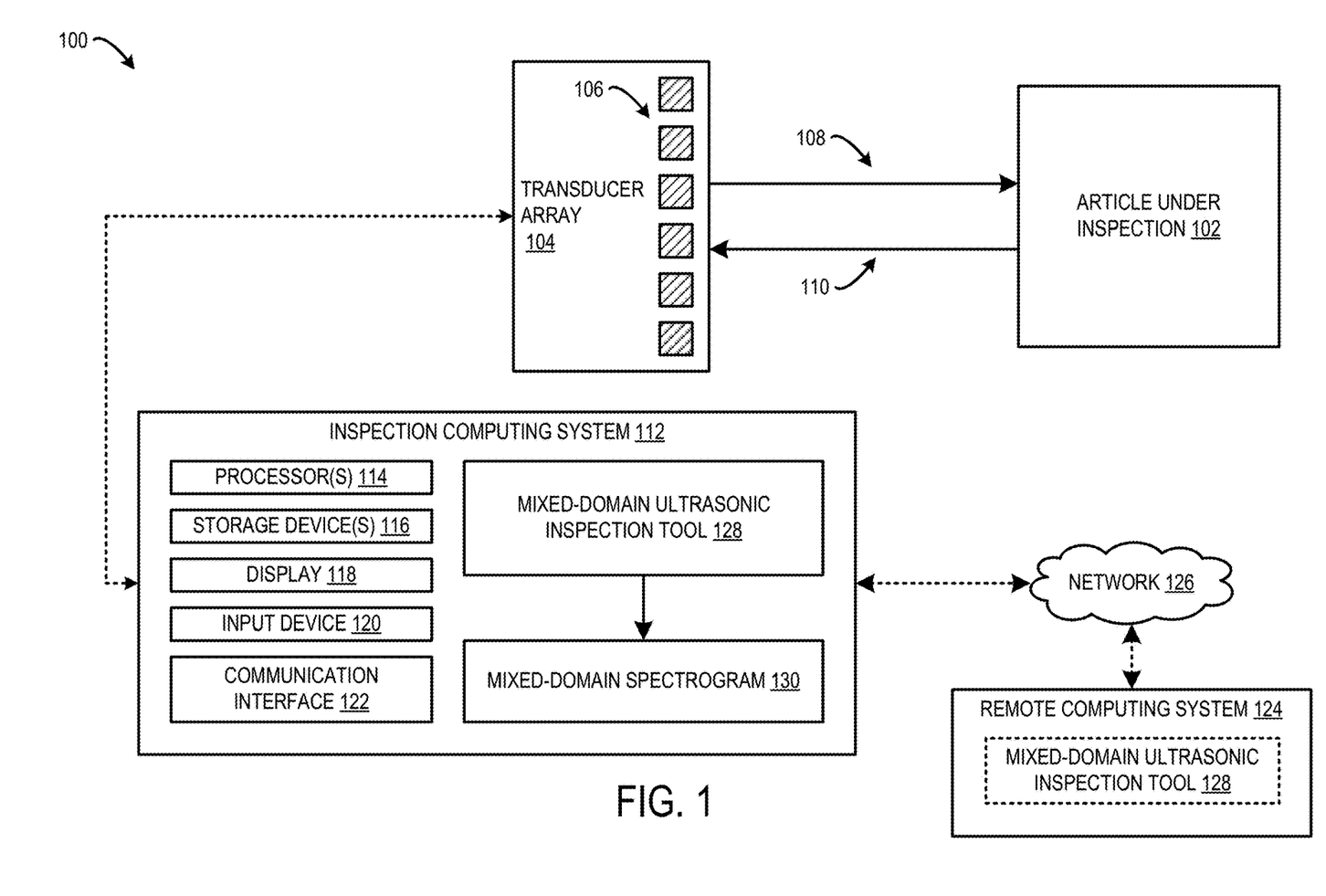
FIG. 1 shows an embodiment of an ultrasonic inspection system.

FIG. 1 shows an embodiment of an ultrasonic inspection system 100 that is used to perform nondestructive testing of an article under inspection 102. For discussion purposes, the article under inspection 102 will be described herein using the example of an aircraft component having an internal structured formed from a plurality of plies of thermoset composite material. During the fabrication process, anomalies may form within the internal structure. As one example, anomalies may form along bond lines between adjacent plies of the thermoset composite material. Such anomalies may be identified using the mixed-domain analysis method for evaluation of ultrasonic inspection data described herein.

It will be appreciated that the ultrasonic inspection system 100 may be used to inspect any suitable type of article having any type of internal structure. The ultrasonic inspection system 100 may be used to inspect various articles across myriad applications including but not limited to automotive, petroleum, computer, nautical, aeronautical, aerospace and medicine. In some instances, the ultrasonic inspection system 100 may be used in a production environment during manufacture of an article. In some instances, the ultrasonic inspection system 100 may be used in a working environment in which an article is being inspected during an operational lifecycle of the article.

The ultrasonic inspection system 100 comprises a transducer array 104 including a plurality of transducers 106. Each transducer 106 is configured to generate high frequency ultrasonic pulses of energy in the form of sound waves 108 that are directed into the article under inspection 102. Each of the transducers is independently controllable to emit the ultrasonic pulses. By varying the timing of different ultrasonic pulses emitted from different transducers, emitted ultrasonic energy may be steered to different regions of the article under inspection 102. For example, by making the pulse from each transducer progressively delayed across the array 104, a pattern of constructive interference is formed that results in radiating a quasi-plane ultrasonic beam at a set angle depending on the progressive time delay. In other words, by changing the progressive time delay the beam can be steered electronically such that the beam can be swept through the article under inspection 102. When the ultrasonic sound waves encounter geometry (front surface, rear surface, material discontinuities, material boundaries, anomalies, etc.) within the article under inspection, the ultrasonic sound waves are reflected back to the transducer array 104. The transducer array 104 is configured to transform the reflected ultrasonic waveform into an electrical return signal 110.

Figure 2:
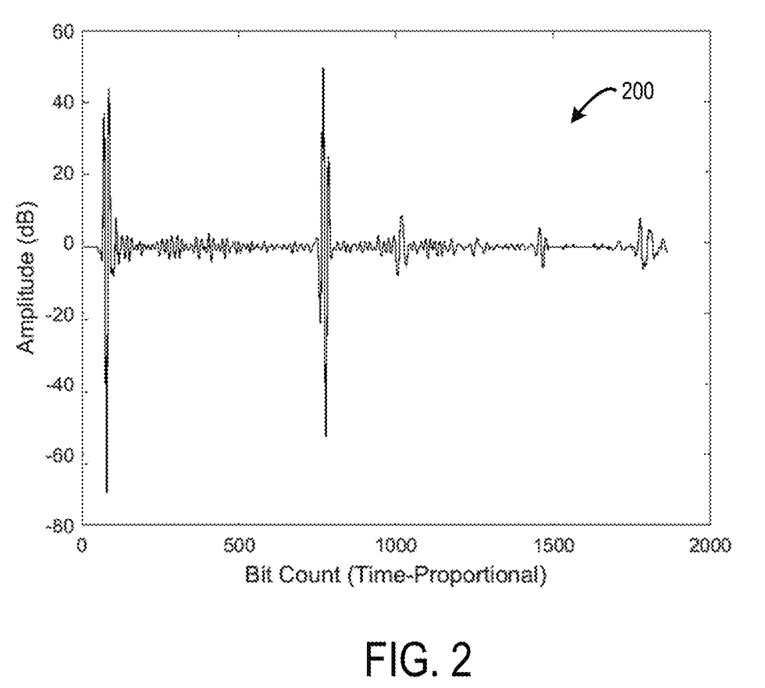
FIG. 2 is a time domain graph corresponding to an example return signal of an ultrasonic waveform applied to an article under inspection.

FIG. 2 shows a time domain graph 200 corresponding to an example return signal that may be representative of the return signal 110 shown in FIG. 1. The time domain graph 200 plots an amplitude (measured in decibels (dB)) of the return signal over time (measured in Time-Proportional Bit Count). Variations in amplitude of the return signal over time may indicate various structural characteristics of the article under inspection 102 that may be evaluated using mixed-domain analysis as described herein. For example, high amplitude portions of the return signal may indicate a front surface, back surface, a material interface, and other structural features of the article under inspection.

Returning to FIG. 1, the transducer array 104 is configured to send the return signal 110 to an inspection computing system 112 for analysis of the article under inspection 102. The inspection computing system 112 comprises one or more processors 114, one or more storage devices 116, a display 118, an input device 120, and a communication interface 122. The one or more processors 114 are communicatively coupled with one or more storage devices 116. The one or more processors 114 can be configured to execute instructions stored in the one or more storage devices 116. For example, the one or more processors 114 can execute instructions that are part of one or more tools, applications, services, programs, routines, libraries, objects, components, data structures, or other logical constructs. The one or more processors 114 can be configured to execute software instructions. Additionally, or alternatively, the one or more processors 114 can be configured to execute hardware or firmware instructions. The processors 114 can be single-core or multi-core, and the instructions executed thereon can be configured for sequential, parallel, and/or distributed processing. The one or more storage devices 116 can include volatile, nonvolatile, dynamic, static, read/write, read-only, random-access, sequential-access, location-addressable, file-addressable, and/or content-addressable devices. Aspects of the one or more processors 114 and the one or more storage devices 116 can be integrated together into one or more hardware-logic components. Such hardware-logic components can include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The display 118 can include one or more display devices utilizing virtually any type of technology. Such display devices can be combined with the computer 112 in a shared enclosure, or such display devices can be peripheral display devices. The display 118 may be configured to visually present a mixed-domain spectrogram and any associated time-frequency characteristic evaluations of an article under inspection represented by the mixed-domain spectrogram.

The input device 120 includes or interfaces with one or more devices configured to translate human actions into computer-understandable information. Nonlimiting examples of input devices include a keyboard, mouse, track pad, button, dial, touchscreen, and/or computer interface (e.g., serial or universal serial bus) for interfacing with peripheral input devices. In some embodiments, the input device 120 can comprise or interface with selected natural user input (NUI) componentry. Such componentry can be integrated or peripheral, and the transduction and/or processing of input actions can be handled on- or off-board. Example NUI componentry can include a microphone for speech and/or voice recognition; an infrared, color, stereoscopic, and/or camera for machine vision and/or gesture recognition. The input device 120 may be configured to enable a user to provide user input to size and position a window corresponding to a mixed-domain spectrogram for an article under inspection. Moreover, the user input device 120 may be configured to enable a user to provide user input to set a data gate that defines an area of interest in a mixed-domain spectrogram and perform time-frequency characteristics in the area of interest in order to identify material characteristics and/or anomaly characteristics of the article under inspection.

The communication interface 122 is configured to communicate data between the inspection computing system 112 and a remote computing system 124 via a computer network 126 such that the inspection computing system 112 and the remote computing system 124 are communicatively coupled. The communication interface 122 includes wired and/or wireless communication devices compatible with one or more different communication protocols. As non-limiting examples, the communication interface 122 can be configured for communication via a wireless telephone network, or a wired or wireless local- or wide-area network.

The inspection computing system 112 is configured such that the one or more storage devices 116 hold instructions executable by the one or more processors 114 to execute a mixed-domain ultrasonic inspection tool 128. The mixed-domain ultrasonic inspection tool 128 is configured to evaluate ultrasonic inspection data corresponding to the return signal 110. In order to perform such evaluations, the mixed-domain inspection tool 128 is configured to digitally process the return signal 110 of the ultrasonic waveform applied to the article under inspection 102. In some embodiments, the mixed-domain inspection tool 128 is configured to use Fast-Fourier Transform analysis on windowed sections of the return signal 110 to generate a representation of the return signal in the frequency domain. In one example, the mixed-domain ultrasonic inspection tool 128 is configured to use Short-Time Fourier Transform (STFT) analysis on the return signal 110. In other examples, other forms of Fourier Transform analysis may be used to digitally process the return signal 110.

Figure 3:
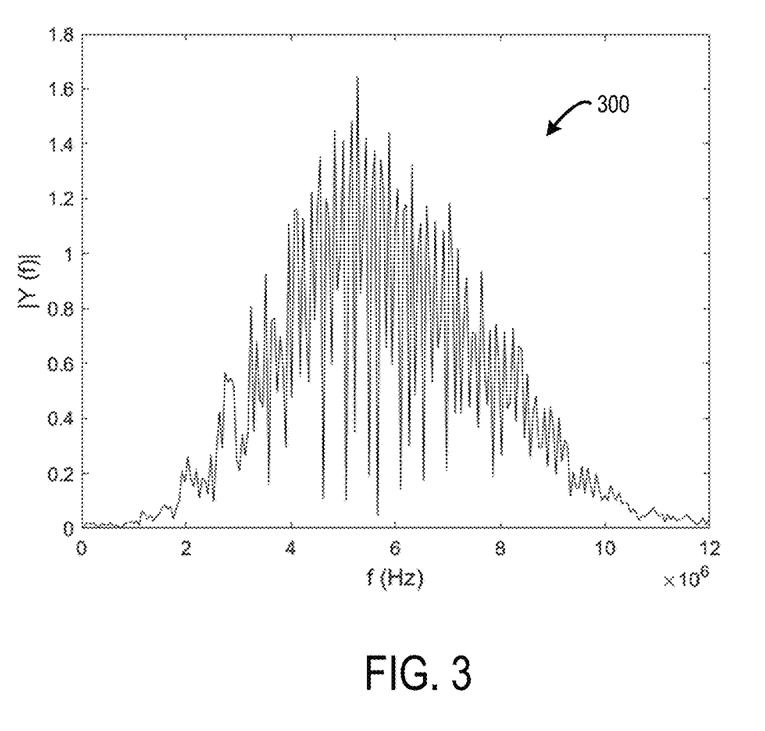
FIG. 3 is a frequency domain graph corresponding to an example return signal of an ultrasonic waveform applied to an article under inspection.

FIG. 3 shows a frequency domain graph 300 corresponding to an example return signal that may be representative of the return signal 110 shown in FIG. 1. The frequency domain graph 300 plots an amplitude (measured as a function of frequency |Y(f)|) of the return signal over a frequency range (measured in Hertz (Hz)). Variations in amplitude of the return signal over the frequency spectrum may indicate various structural characteristics of an article under inspection that may be evaluated using mixed-domain analysis as described herein.

Returning to FIG. 1, the mixed-domain ultrasonic inspection tool 128 is configured to perform digital processing on the return signal 110 based on both the time domain information and the frequency domain information to generate a mixed-domain spectrogram 130 corresponding to the return signal 110.

Figure 4:
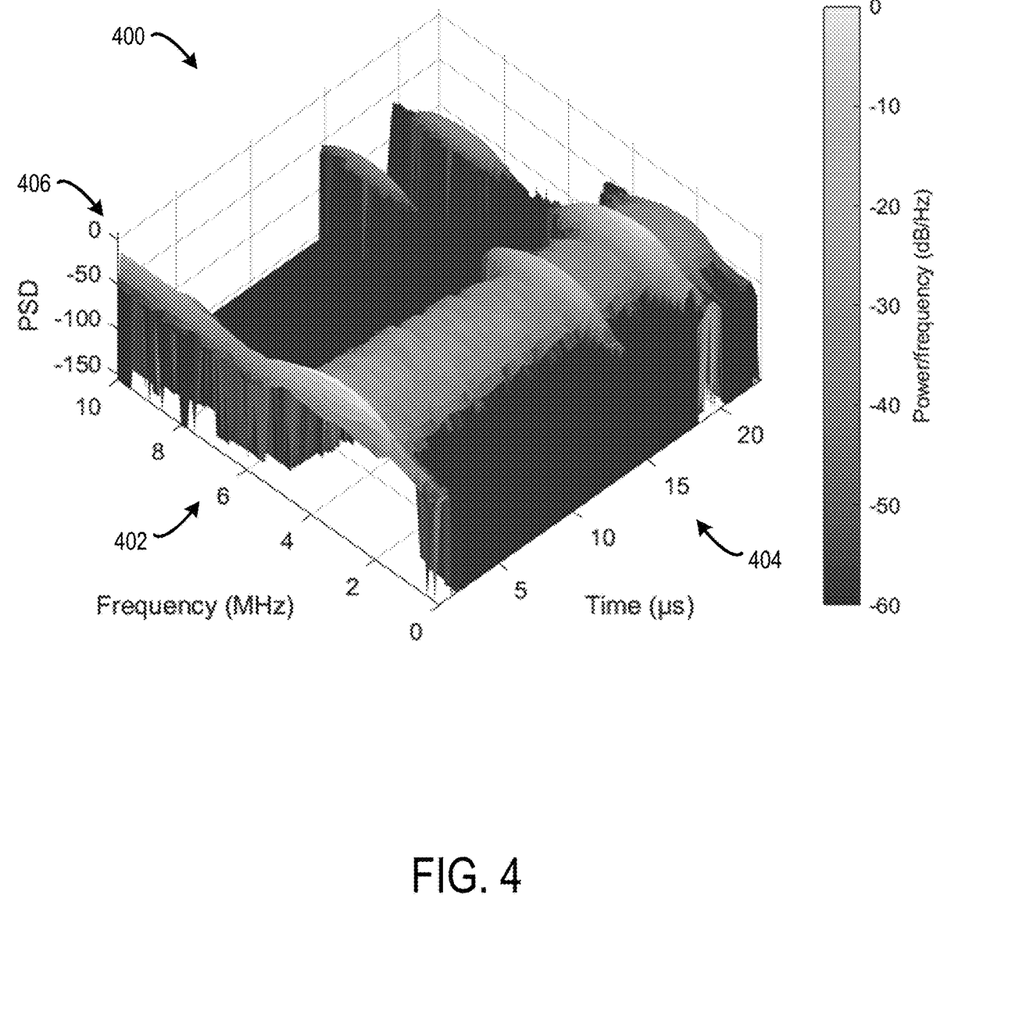
FIG. 4 shows a mixed-domain spectrogram corresponding to an example return signal of an ultrasonic waveform applied to an article under inspection.

FIG. 4 shows a mixed-domain spectrogram 400 corresponding to an example return signal that may be representative of the return signal 110 shown in FIG. 1. The mixed-domain spectrogram 400 plots a range of a frequency 402 of the return signal 110 along the Y axis. The mixed-domain spectrogram 400 plots a range of time of flight 404 of the return signal 110 along the X axis. The time of flight 404 characterizes the time for the ultrasonic waveform to travels through the inspected article and reflect back to the transducer array. The time of flight can be used to determine the location of structural features and/or anomalies within the article under inspection. The mixed-domain spectrogram 400 also plots a range of a power spectral density 406 of the return signal 110 along the Z axis. The power spectral density indicates the strength of the energy of the return signal as a function of frequency. Additionally, the amplitude of the power spectral density 406 is indicated by a greyscale, such that the greyscale becomes lighter as the amplitude of the power spectral density increases within the plotted range of power spectral density and the greyscale becomes darker as the amplitude of the power spectral density decreases within the plotted range of power spectral density.

Returning to FIG. 1, the mixed-domain ultrasonic inspection tool 128 is further configured to identify various material characteristics and/or anomaly characteristics of the article under inspection 102 based on evaluations of one or more time-frequency characteristics of the mixed-domain spectrogram 130 as will be discussed in further detail herein. The mixed-domain ultrasonic inspection tool 128 may be configured to identify any suitable material characteristic of an article under inspection including, but not limited to a material type, a change in material composition at a particular location, a location of a particular internal structural feature of the article, and other suitable material characteristics. Further, the mixed-domain ultrasonic inspection tool 128 may be configured to identify any suitable anomaly characteristic of an article under inspection including, but not limited to a an anomaly that occurs along a bond line, delamination between structural layers, cracks, holes, and other anomaly characteristics.

In some embodiments, the mixed-domain inspection tool 128 may be at least partially executed by the remote computing system 124 such that at least some of the functionality of the mixed-domain ultrasonic inspection tool 128 may be performed and/or enhanced by the remote computing system 124. As one example, the mixed-domain inspection tool 128 may be configured to generate a mixed-domain spectrogram and send the mixed-domain spectrogram to the remote computing system 124. The remote computing system 124 may be configured to execute an automatic material or anomaly characteristic identification tool that is configured to automatically identify material or anomaly characteristics of an article under inspection based on analysis of the mixed-domain spectrogram and any time-characteristic evaluations perform on an area of interest in a data gate set for the mixed-domain spectrogram. In some embodiments, such a characteristic identification tool may employ machine learning technology to facilitate such automatic identification.

Figure 5:
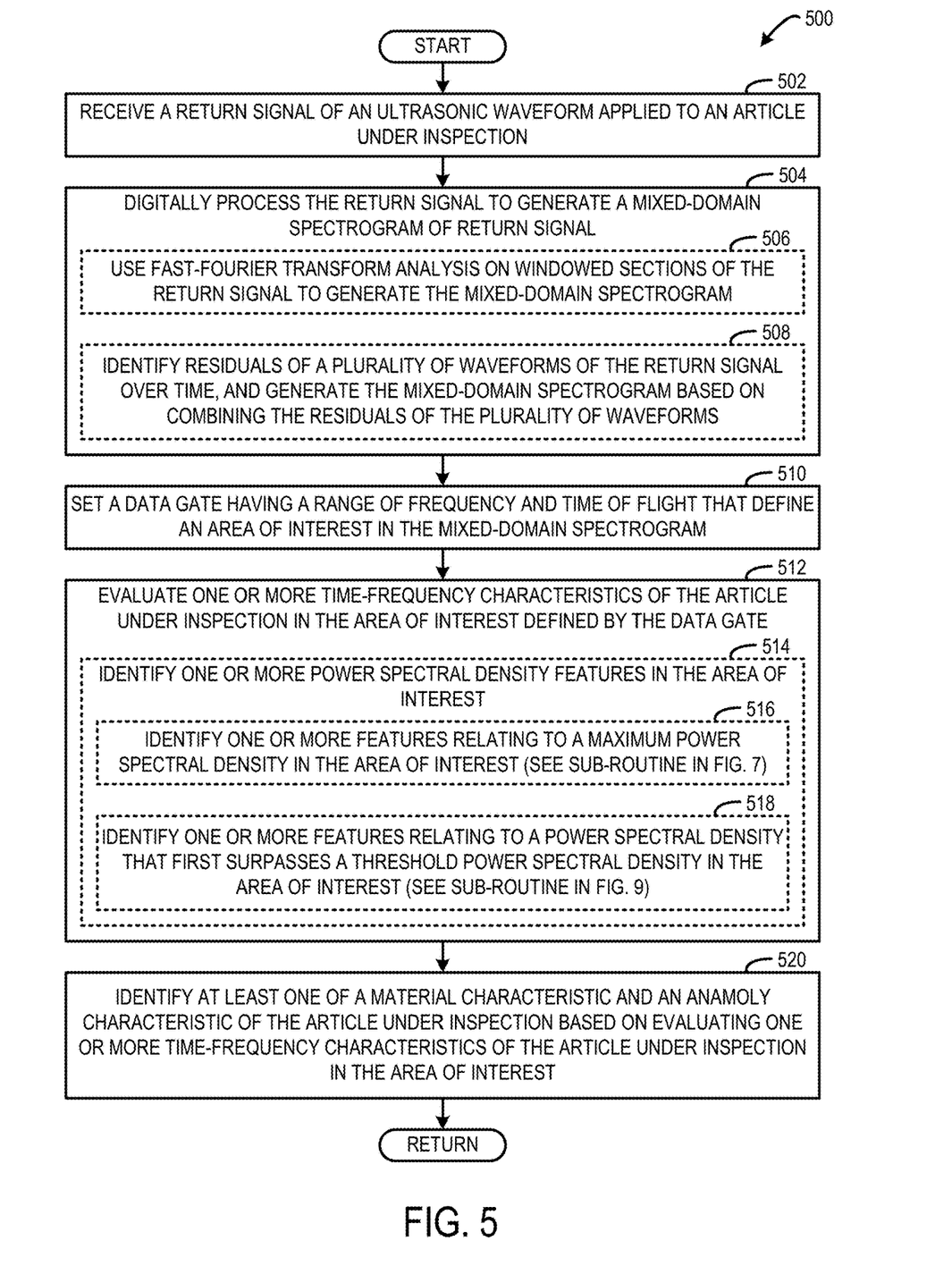
FIG. 5 is a flowchart of an exemplary embodiment of a mixed-domain analysis method for evaluation of ultrasonic inspection data corresponding to an article under inspection.

In some embodiments, the mixed-domain inspection tool 128 may be configured to perform a mixed-domain analysis method 500 shown in FIG. 5 for evaluation of ultrasonic inspection data corresponding to the return signal 110 in order to identify various material characteristics and/or anomaly characteristics of the article under inspection 102. More generally, the mixed-domain analysis method 500 may be performed by any suitable computing system.

At 502, the method 500 includes receiving a return signal of an ultrasonic waveform applied to an article under inspection. As one example, the return signal may be return signal 110 shown in FIG. 1.

At 504, the method 500 includes digitally processing the return signal to generate a mixed-domain spectrogram of the return signal. The mixed-domain spectrogram plots ranges of a frequency of the return signal, a time of flight of the return signal, and a power spectral density of the return signal. The mixed-domain spectrogram may correspond to any suitable area of the article under inspection. Further, the mixed-domain spectrogram can be constructed using a sliding window of Fast Fourier Transforms having settings that are adjustable to move/resize the window to include different sized areas of the article under inspection.

In some embodiments, at 506, digitally processing the return signal may include using Fast-Fourier Transform (STFT) analysis on windowed sections of the return signal to generate the mixed-domain spectrogram. In one example, Short-time Fourier transform is used to determine frequency and phase content of local sections of the return signal as it changes over time. STFT analysis may be performed by dividing the return signal into segments of equal length over a time period and computing the Fourier transform separately on each shorter segment to reveal the Fourier spectrum on each shorter segment that may be plotted in the spectrogram.

In some embodiments, at 508, digitally processing the return signal may include identifying residuals of a plurality of waveforms of the return signal over time and generating the mixed-domain spectrogram based on combining the waveform residuals. The waveforms may correspond to different locations within the article under inspection based on a scan using a transducer array that emits a plurality of ultrasonic pulses that collectively form the return signal based on reflecting back from different structural features within the article under inspection. As used herein, residuals are local maximum peaks and minimum nadirs of amplitude of the waveforms. The residuals of the plurality of waveforms may be combined in any suitable manner. As one example, the residuals of the plurality of waveforms may be added together in a common spectrogram in a window of time and frequency that corresponds to an area of the article under inspection.

Figure 6A:
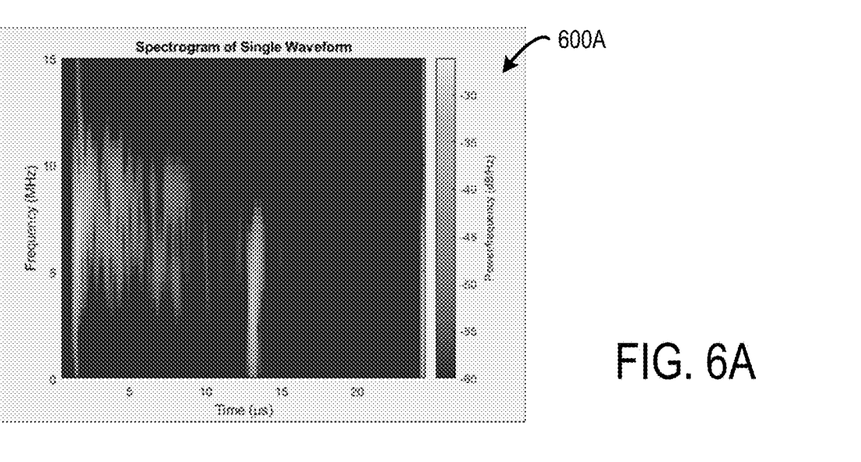
FIGS. 6A-6C show graphs of spectrograms representative of an exemplary derivation for generating a mixed-domain spectrogram of a return signal corresponding to an ultrasonic waveform applied to an article under inspection.
Figure 6B:
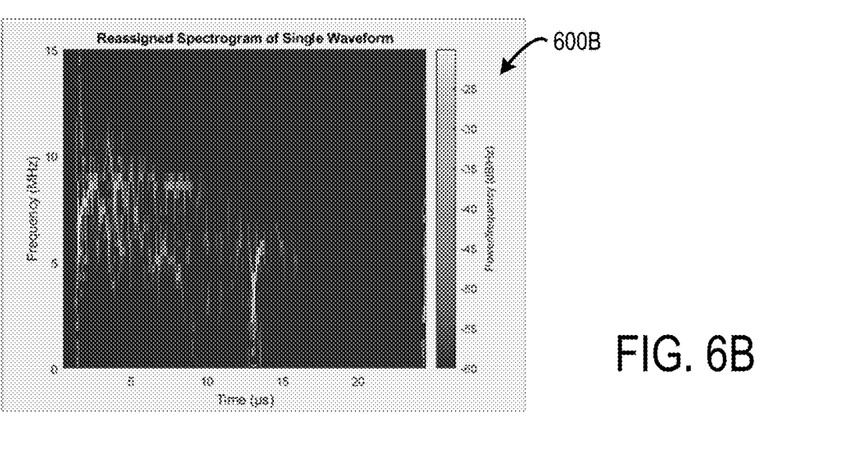
Figure 6C:
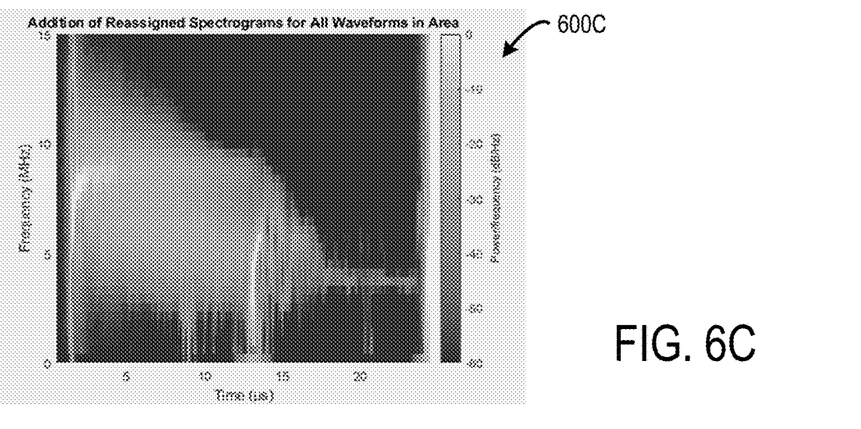

FIGS. 6A-6C show spectrograms representative of an exemplary derivation for generating a mixed-domain spectrogram of a return signal corresponding to an ultrasonic waveform applied to an article under inspection. FIG. 6A shows a spectrogram 600A representative of a single waveform of an example return signal. The spectrogram 600A has window that is scaled to have a relatively high granularity of Fourier spectrum of the waveform. FIG. 6B shows a spectrogram 600B of the same waveform as the spectrogram 600A shown in FIG. 6A. The spectrogram 600B has an adjusted scale relative to the spectrogram 600A, such that the only residuals are retained in the spectrogram 600B. This type of scaling may be applied to each of the plurality of waveforms corresponding to different locations in an area of an article under inspection. The resulting residuals from the plurality of waveforms may be added to together to generate a mixed-domain spectrogram 600C of the area of the article under inspection as shown in FIG. 6C. The mixed-domain spectrogram 600C may retain frequency content of the area of the article under inspection to a greater degree than a spectrogram that is generated in a different manner where the waveforms are averaged together. Such averaging may cause destructive interference among different waveforms that causes frequency content to be lost in the resulting spectrogram.

FIGS. 6A-6C show spectrograms that are representative of one exemplary derivation for generating a mixed-domain spectrogram. In other embodiments, alternative derivations may be used to generate a mixed-domain spectrogram. For example, other derivations may use a single spectrogram that is extrapolated to cover an area of the article under inspection without actually visualizing all the time-frequency information in the same common spectrogram. These are but examples—the mixed-domain spectrogram may be generated in any suitable manner.

Returning to FIG. 5, at 510, the method 500 includes setting a data gate having ranges of frequency and time of flight that define an area of interest in the mixed-domain spectrogram. The area of interest corresponds to a physical position within the article under inspection (e.g., a particular structural feature being examined). The area of interest defined by the data gate may have any suitable size within the mixed-domain spectrogram. Moreover, the area of interest defined by the data gate may be located at any appropriate/preferred place within the mixed-domain spectrogram. Additionally, the mixed-domain spectrogram defines a window that can be moved to various locations to inspect different portions of the article under inspection and the data gate may be set to any suitable location within that movable window. The data gate may be set to inspect any suitable feature or structure within the article under inspection. In some examples, the data gate may be set to locations known to correspond to features within the article under inspection. Returning to the example of the aircraft component, the data gate may be set to inspect a bond line where a plurality of different plies of thermoset material are joined together in order to inspect for anomalies in the bond line.

In some examples, the data gate may be set such that various evaluations that are performed to characterize the article under inspection are limited to the area of interested defined, as opposed to having to perform evaluations across the entire mixed-domain spectrogram. In other words, by using the data gate to define the area of interest, computational resources used to perform evaluations of the article under inspection may be reduced relative to evaluations that are applied to the entire mixed-domain spectrogram. Moreover, such evaluations that are applied to the area of interest may produce results having a higher signal to noise ratio relative to evaluations that are applied to the entire mixed-domain spectrogram. Such an increase in signal to noise ratio result in more definitive or confident evaluation results.

At 512, the method 500 includes evaluating one or more time-frequency characteristics of the article under inspection in the area of interest defined by the data gate. Any suitable time-frequency characteristic of the article of interest may be evaluated in the area of interest. In some embodiments, at 514, evaluating one or more time-frequency characteristics may include identifying one or more power spectral density features in the area of interest.

Figure 7:
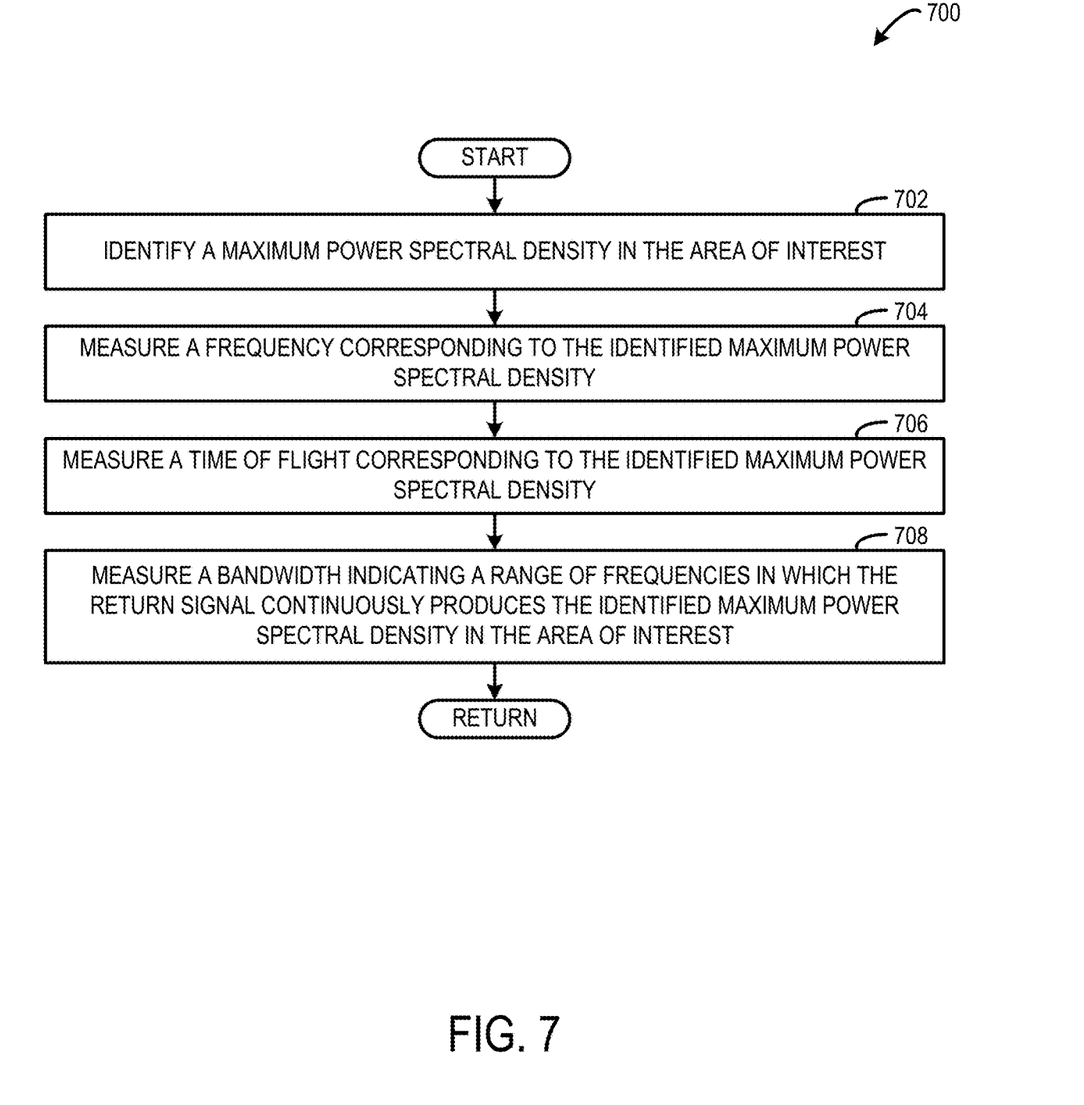
FIG. 7 shows an exemplary embodiment of a time-frequency characteristic evaluation sub-routine that may be performed based on a maximum power spectral density in an area of interest in a spectrogram.

In some embodiments, at 516, identifying one or more power spectral density features may include identifying one or more features relating to a maximum power spectral density in the area of interest. FIG. 7 shows an exemplary embodiment of a time-frequency characteristic evaluation sub-routine 700 that may be performed based on a maximum power spectral density in an area of interest in a mixed-domain spectrogram. Any or all of the sub-routine 700 optionally may be performed as part of the method 500 shown in FIG. 5.

At 702, the sub-routine 700 includes identifying a maximum power spectral density in the area of interest. The maximum power spectral density corresponds to the highest amplitude of the return signal in the area of interest (i.e., the greatest Z axis magnitude in the area of interest).

At 704, the sub-routine 700 includes measuring a frequency corresponding to the identified maximum power spectral density (i.e., a Y axis value on the mixed-domain spectrogram). In some instances, the frequency of the maximum power spectral density may indicate a type of material of the article under inspection. As one example, an acoustic impedance mismatch at an interface of two materials may cause a particular frequency response that may be identified through evaluation of such time-frequency characteristics.

At 706, the sub-routine 700 includes measuring a time of flight corresponding to the identified maximum power spectral density (i.e., an X axis value on the mixed-domain spectrogram) at which the maximum power spectral density occurs. The time of flight at which the maximum power spectral density occurs may be used to indicate a position within the article under inspection of an identified material characteristic or an identified anomaly characteristic.

At 708, the sub-routine 700 includes measuring a bandwidth indicating a range of frequencies in which the return signal continuously produces the identified maximum power spectral density in the area of interest.

Figure 8:
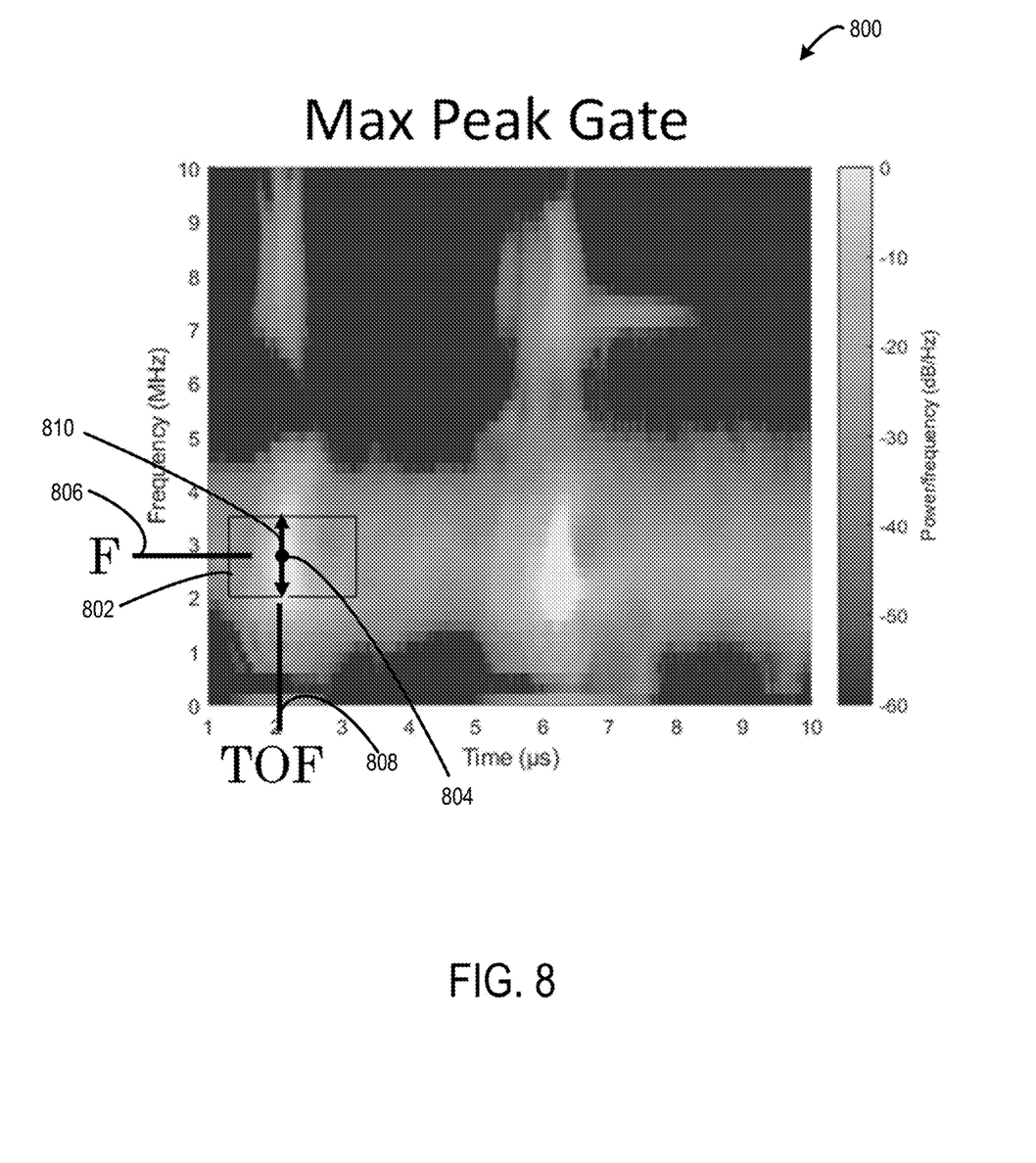
FIG. 8 shows an example time-frequency characteristic evaluation of a maximum power spectral density that is applied to an area of interest in a mixed-domain spectrogram.

FIG. 8 shows an example time-frequency characteristic evaluation of a maximum power spectral density in an area of interest in a mixed-domain spectrogram based on performing the sub-routine 700 shown in FIG. 7. The mixed-domain spectrogram 800 includes an area of interest 802 defined by a data gate. A maximum power spectral density 804 is identified within the area of interest 802. A frequency 806 at which the maximum power spectral density occurs in the area of interest 802 is measured. A time of flight 808 at which the maximum power spectral density occurs in the area of interest 802 is measured. A bandwidth 810 corresponding to the maximum power spectral density in the area of interest 802 is measured. These time-frequency characteristics that are evaluated in the area of interest for the article under inspection may be used to identify material characteristics and/or anomaly characteristics of the article under inspection.

Figure 9:
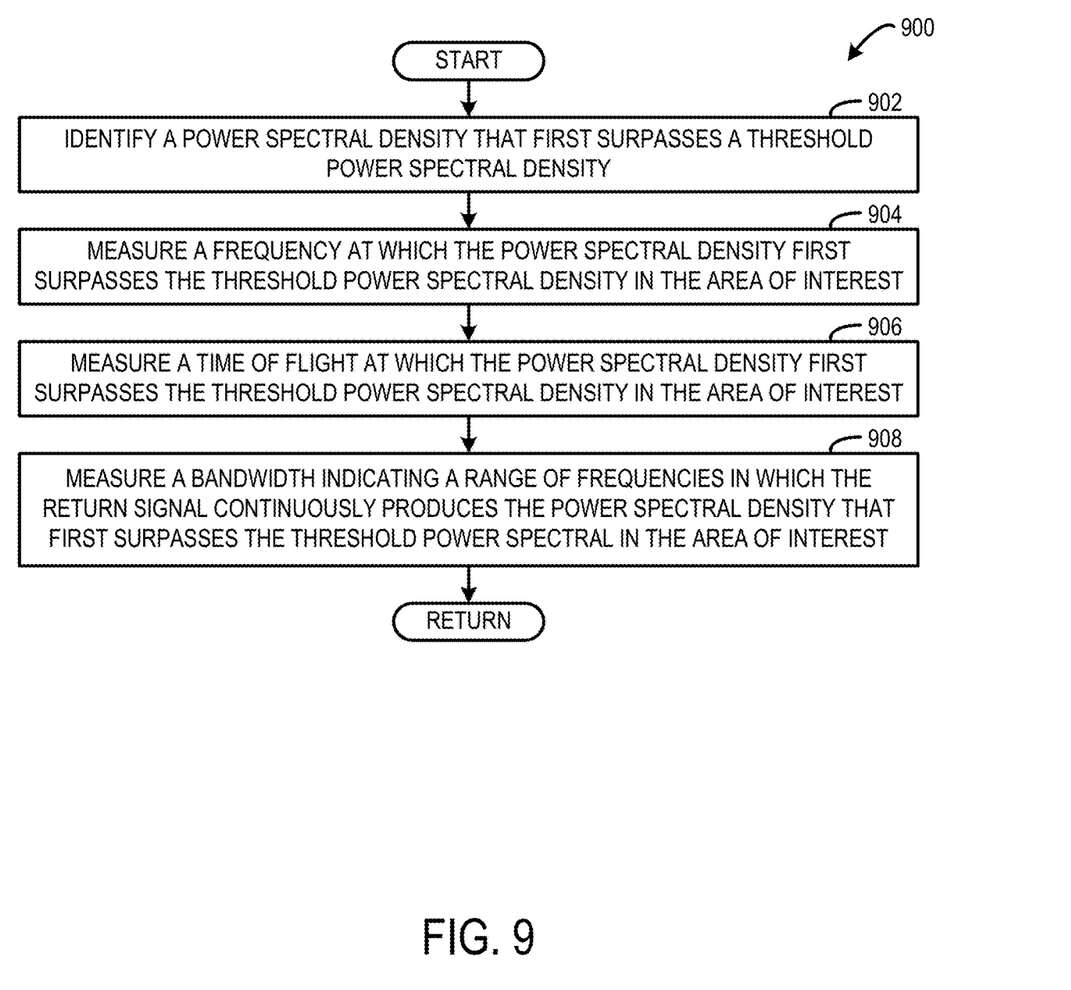
FIG. 9 shows an exemplary embodiment of a time-frequency characteristic evaluation sub-routine that may be performed based on a power spectral density surpassing a threshold power spectral density in an area of interest in a spectrogram.

Returning to FIG. 5, in some embodiments, at 518, identifying one or more power spectral density features may include identifying one or more features relating to a power spectral density that first surpasses a threshold power spectral density in the area of interest. FIG. 9 shows an exemplary embodiment of a time-frequency characteristic evaluation sub-routine that may be performed based on a power spectral density surpassing a threshold power spectral density in an area of interest in a mixed-domain spectrogram. Any or all of the sub-routine 900 optionally may be performed as part of the method 500 shown in FIG. 5.

At 902, the sub-routine 900 includes identifying a power spectral density that first surpasses a threshold power spectral density in the area of interest. The threshold power spectral density may be set to any suitable power spectral density. For example, the threshold may be set to a power spectral density that is known to corresponding to a particular type of material in order to identify a material interface in the area of interest. In this example, this type of evaluation starts on the left side of the area of interest toward a front surface of the article under inspection and moves rightward toward a rear surface of the article under inspection. In other examples, the area of interest may be scanned in a different manner.

At 904, the sub-routine 900 includes measuring a frequency corresponding to the identified power spectral density (i.e., a Y axis value on the mixed-domain spectrogram). The frequency of the power spectral density that first surpasses the threshold power spectral density may indicate a type of material of the article under inspection. As one example, an acoustic impedance mismatch at an interface of two materials may cause a particular frequency response that may be identified through evaluation of such time-frequency characteristics.

At 906, the sub-routine 900 includes measuring a time of flight corresponding to the identified power spectral density that first surpasses the threshold power spectral density (i.e., an X axis value on the mixed-domain spectrogram). The time of flight at which the power spectral density first surpasses the threshold power spectral density may be used to indicate a position within the article under inspection of an identified material characteristic or an identified anomaly characteristic.

At 908, the sub-routine 900 includes measuring a bandwidth indicating a range of frequencies in which the return signal continuously produces the identified power spectral density that is greater than the threshold power spectral density in the area of interest.

Figure 10:
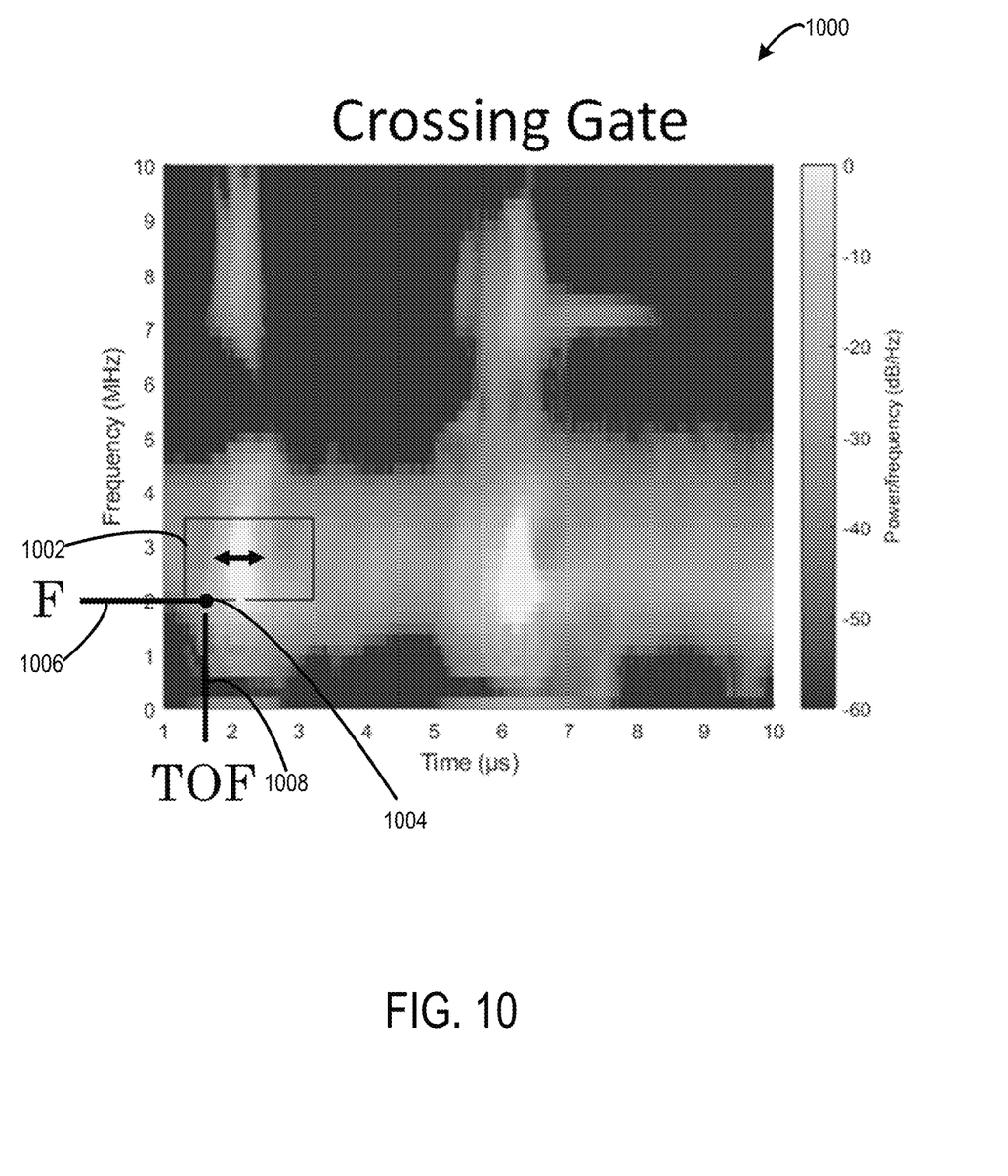
FIG. 10 shows an example time-frequency characteristic evaluation of a power spectral density that surpasses a threshold power spectral density that is applied to an area of interest in a mixed-domain spectrogram.

FIG. 10 shows an example time-frequency characteristic evaluation of a power spectral density that first surpasses a threshold power spectral density in an area of interest in a mixed-domain spectrogram based on performing the sub-routine 900 shown in FIG. 9. The mixed-domain spectrogram 1000 includes an area of interest 1002 defined by a data gate. A power spectral density 1004 that first surpasses a threshold power spectral density is identified within the area of interest 1002. A frequency 1006 at which the power spectral density first surpasses the threshold power spectral density in the area of interest 1002 is measured. A time of flight 1008 at which the power spectral density first surpasses the threshold power spectral density in the area of interest 1002 is measured. A bandwidth 1010 corresponding to the power spectral density that first surpasses the threshold power spectral density in the area of interest 1002 is measured. These time-frequency characteristics that are evaluated in the area of interest for the article under inspection may be used to identify material characteristics and/or anomaly characteristics of the article under inspection.

Returning to FIG. 5, at 520, the method 500 includes identifying at least one of a material characteristic and an anomaly characteristic of the article under inspection based on evaluating one or more time-frequency characteristics of the article under inspection in the area of interest. Any suitable material or anomaly characteristic may be identified based on evaluation of the time-frequency characteristics. Moreover, any suitable number of different material or anomaly characteristics may be identified based on such evaluations. In some embodiments, identifying a characteristic of the article under inspection may include visually presenting an indication of the characteristic on a display of the inspection computing system. In some embodiments, identifying a characteristic may include visually presenting one or more labels corresponding to the identified characteristic(s). The material characteristics and anomaly characteristics of the article under inspection may be identified in any suitable manner based on the evaluation(s) of the time-frequency characteristics of the area of interest.

Returning to the example of the aircraft component, as one example, the evaluation of the bandwidth of the maximum power spectral density may be used to successfully identify anomalies relatively close to an inspection surface of the aircraft component. Additionally, the evaluation of the bandwidth of the maximum power spectral density may be used to successfully identify anomalies relatively close to adhesive layers. As another example, the time of flight evaluation for both of the maximum power spectral density and the threshold crossing may be used to show high-fidelity images of near and mid-surface inserts (without adhesive present) in the aircraft component. The evaluation of the bandwidth for the power spectral density crossing the threshold may be useful for high signal to noise ratio evaluation of the far surface of the article and adhesive layer anomalies proximate to the far surface of the article. Also, anomalies in the aircraft component cause reduced bandwidths and shifts in position of maximum frequency allowing for these anomalies to be separated from high-amplitude responses of surrounding structure. The bandwidth and time of flight evaluations with through-thickness maximum power spectral density gates are capable of differentiating anomaly signals at various depths with a single gate. In other words, the high signal to noise ratio of these evaluations performed on the mixed-domain spectrogram allow for a reduced number of data gates to be used to inspect an article relative to other single domain inspection approaches. As a result, the mixed-domain analysis method may reduce time and cost of inspection relative to other single domain inspection approaches.

In an example, a mixed-domain analysis method for evaluation of ultrasonic inspection data comprises receiving a return signal of an ultrasonic waveform applied to an article under inspection, digitally processing the return signal to generate a mixed-domain spectrogram of the return signal, where the mixed-domain spectrogram plots ranges of a frequency of the return signal, a time of flight of the return signal, and a power spectral density of the return signal, setting a data gate having ranges of frequency and time of flight that define an area of interest in the mixed-domain spectrogram, and identifying at least one of a material characteristic and an anomaly characteristic of the article under inspection based on evaluating one or more time-frequency characteristics of the article under inspection in the area of interest. In this example and/or other examples, digitally processing the return signal may include using a Fast-Fourier Transform analysis on windowed sections of the return signal to generate the mixed-domain spectrogram. In this example and/or other examples, digitally processing the return signal may include identifying residuals of a plurality of waveforms of the return signal over time, and wherein the mixed-domain spectrogram is generated based on combining the residuals of the plurality of waveforms. In this example and/or other examples, evaluating one or more time-frequency characteristics of the article under inspection may include identifying a power spectral density feature in the area of interest. In this example and/or other examples, the identified power spectral density feature may include a maximum power spectral density in the area of interest. In this example and/or other examples, evaluating one or more time-frequency characteristics of the article under inspection may include measuring a frequency corresponding to the identified maximum power spectral density. In this example and/or other examples, evaluating one or more time-frequency characteristics of the article under inspection may include measuring a time of flight corresponding to the identified maximum power spectral density. In this example and/or other examples, evaluating one or more time-frequency characteristics of the article under inspection may include measuring a bandwidth indicating a range of frequencies in which the return signal continuously produces the identified maximum power spectral density in the area of interest. In this example and/or other examples, the identified power spectral density feature may include a power spectral density that surpasses a threshold power spectral density. In this example and/or other examples, evaluating one or more time-frequency characteristics of the article under inspection may include measuring a frequency at which the power spectral density surpasses the threshold power spectral density in the area of interest. In this example and/or other examples, evaluating one or more time-frequency characteristics of the article under inspection may include measuring a time of flight at which the power spectral density surpasses the threshold power spectral density in the area of interest. In this example and/or other examples, evaluating one or more time-frequency characteristics of the article under inspection may include measuring a bandwidth indicating a range of frequencies in which the return signal continuously produces the power spectral density that surpasses the threshold power spectral in the area of interest.

In an example, a computing system comprises one or more processors, one or more storage devices holding instructions executable by the one or more processors to execute a mixed time-frequency domain ultrasonic inspection tool configured to receive a return signal of an ultrasonic waveform applied to an article under inspection, digitally process the return signal to generate a mixed-domain spectrogram of the return signal, where the mixed-domain spectrogram plots ranges of a frequency of the return signal, a time of flight of the return signal, and a power spectral density of the return signal, set a data gate having ranges of frequency and time of flight that define an area of interest in the mixed-domain spectrogram, and identify at least one of a material characteristic and an anomaly characteristic of the article under inspection based on evaluating one or more time-frequency characteristics of the article under inspection in the area of interest. In this example and/or other examples, the return signal may be digitally processed using Fast-Fourier Transform (FFT) analysis on windowed sections of the return signal to generate the mixed-domain spectrogram. In this example and/or other examples, digitally processing the return signal may include identifying residuals of a plurality of waveforms of the return signal over time, and wherein the mixed-domain spectrogram is generated based on combining the residuals of the plurality of waveforms. In this example and/or other examples, evaluating one or more time-frequency characteristics of the article under inspection may include identifying a maximum power spectral density in the area of interest. In this example and/or other examples, evaluating one or more time-frequency characteristics of the article under inspection may include one or more of measuring a frequency corresponding to the maximum power spectral density, measuring a time of flight corresponding to the maximum power spectral density, and measuring a bandwidth indicating a range of frequencies in which the return signal continuously produces the identified maximum power spectral density in the area of interest. In this example and/or other examples, evaluating one or more time-frequency characteristics of the article under inspection may include identifying a power spectral density that surpasses a threshold power spectral density. In this example and/or other examples, evaluating one or more time-frequency characteristics of the article under inspection may include one or more of measuring a frequency at which the power spectral density surpasses the threshold power spectral density in the area of interest, measuring a time of flight at which the power spectral density surpasses the threshold power spectral density in the area of interest, and measuring a bandwidth indicating a range of frequencies in which the return signal continuously produces the power spectral density that surpasses the threshold power spectral density in the area of interest.

In an example, a mixed-domain analysis method for evaluation of ultrasonic inspection data comprises receiving a return signal of an ultrasonic waveform applied to an article under inspection, digitally processing the return signal to generate a mixed-domain spectrogram of the return signal, where the mixed-domain spectrogram plots ranges of a frequency of the return signal, a time of flight of the return signal, and a power spectral density of the return signal, setting a data gate having ranges of frequency and time of flight that define an area of interest in the mixed-domain spectrogram, and identifying at least one of a material characteristic and an anomaly characteristic of the article under inspection based on evaluating one or more time-frequency characteristics of the article under inspection in the area of interest, such evaluating including at least one of (1) identifying a maximum power spectral density in the area of interest and (2) identifying a power spectral density that surpasses a threshold power spectral density.

The present disclosure includes all novel and non-obvious combinations and subcombinations of the various features and techniques disclosed herein. The various features and techniques disclosed herein are not necessarily required of all examples of the present disclosure. Furthermore, the various features and techniques disclosed herein may define patentable subject matter apart from the disclosed examples and may find utility in other implementations not expressly disclosed herein.

The invention claimed is:

1. A mixed-domain analysis method for evaluation of ultrasonic inspection data, the method comprising:
receiving a return signal of an ultrasonic waveform applied to an article under inspection;

digitally processing the return signal to generate a mixed-domain spectrogram of the return signal, where the mixed-domain spectrogram plots ranges of a frequency of the return signal, a time of flight of the return signal, and a power spectral density of the return signal;

setting a data gate having ranges of frequency and time of flight that define an area of interest in the mixed-domain spectrogram; and identifying at least one of a material characteristic and an anomaly characteristic of the article under inspection based on evaluating one or more time-frequency characteristics of the article under inspection in the area of interest.

2. The method of claim 1, wherein digitally processing the return signal includes using Fast-Fourier Transform analysis on windowed sections of the return signal to generate the mixed-domain spectrogram.

3. The method of claim 1, wherein digitally processing the return signal includes identifying residuals of a plurality of waveforms of the return signal over time, and wherein the mixed-domain spectrogram is generated based on combining the residuals of the plurality of waveforms.

4. The method of claim 1, wherein evaluating one or more time-frequency characteristics of the article under inspection includes identifying a power spectral density feature in the area of interest.

5. The method of claim 4, wherein the identified power spectral density feature includes a maximum power spectral density in the area of interest.

6. The method of claim 5, wherein evaluating one or more time-frequency characteristics of the article under inspection includes measuring a frequency corresponding to the identified maximum power spectral density.

7. The method of claim 5, wherein evaluating one or more time-frequency characteristics of the article under inspection includes measuring a time of flight corresponding to the identified maximum power spectral density.

8. The method of claim 5, wherein evaluating one or more time-frequency characteristics of the article under inspection includes measuring a bandwidth indicating a range of frequencies in which the return signal continuously produces the identified maximum power spectral density in the area of interest.

9. The method of claim 4, wherein the identified power spectral density feature includes a power spectral density that surpasses a threshold power spectral density.

10. The method of claim 9, wherein evaluating one or more time-frequency characteristics of the article under inspection includes measuring a frequency at which the power spectral density surpasses the threshold power spectral density in the area of interest.

11. The method of claim 9, wherein evaluating one or more time-frequency characteristics of the article under inspection includes measuring a time of flight at which the power spectral density surpasses the threshold power spectral density in the area of interest.

12. The method of claim 9, wherein evaluating one or more time-frequency characteristics of the article under inspection includes measuring a bandwidth indicating a range of frequencies in which the return signal continuously produces the power spectral density that surpasses the threshold power spectral in the area of interest.

13. A computing system comprising:
one or more processors;
one or more storage devices holding instructions executable by the one or more processors to execute a mixed time-frequency domain ultrasonic inspection tool configured to:
receive a return signal of an ultrasonic waveform applied to an article under inspection;
digitally process the return signal to generate a mixed-domain spectrogram of the return signal, where the mixed-domain spectrogram plots ranges of a frequency of the return signal, a time of flight of the return signal, and a power spectral density of the return signal;
set a data gate having ranges of frequency and time of flight that define an area of interest in the mixed-domain spectrogram; and
identify at least one of a material characteristic and an anomaly characteristic of the article under inspection based on evaluating one or more time-frequency characteristics of the article under inspection in the area of interest.

14. The computing system of claim 13, wherein the return signal is digitally processed using Fast-Fourier Transform (FFT) analysis on windowed sections of the return signal to generate the mixed-domain spectrogram.

15. The computing system of claim 13, wherein digitally processing the return signal includes identifying residuals of a plurality of waveforms of the return signal over time, and wherein the mixed-domain spectrogram is generated based on combining the residuals of the plurality of waveforms.

16. The computing system of claim 13, wherein evaluating one or more time-frequency characteristics of the article under inspection includes identifying a maximum power spectral density in the area of interest.

17. The computing system of claim 16, wherein evaluating one or more time-frequency characteristics of the article under inspection includes one or more of measuring a frequency corresponding to the maximum power spectral density, measuring a time of flight corresponding to the maximum power spectral density, and measuring a bandwidth indicating a range of frequencies in which the return signal continuously produces the identified maximum power spectral density in the area of interest.

18. The computing system of claim 13, wherein evaluating one or more time-frequency characteristics of the article under inspection includes identifying a power spectral density that surpasses a threshold power spectral density.

19. The computing system of claim 18, wherein evaluating one or more time-frequency characteristics of the article under inspection includes one or more of measuring a frequency at which the power spectral density surpasses the threshold power spectral density in the area of interest, measuring a time of flight at which the power spectral density surpasses the threshold power spectral density in the area of interest, and measuring a bandwidth indicating a range of frequencies in which the return signal continuously produces the power spectral density that surpasses the threshold power spectral density in the area of interest.

20. A mixed-domain analysis method for evaluation of ultrasonic inspection data, the method comprising:
receiving a return signal of an ultrasonic waveform applied to an article under inspection;
digitally processing the return signal to generate a mixed-domain spectrogram of the return signal, where the mixed-domain spectrogram plots ranges of a frequency of the return signal, a time of flight of the return signal, and a power spectral density of the return signal;

setting a data gate having ranges of frequency and time of flight that define an area of interest in the mixed-domain spectrogram; and identifying at least one of a material characteristic and an anomaly characteristic of the article under inspection based on evaluating one or more time-frequency characteristics of the article under inspection in the area of interest, such evaluating including at least one of (1) identifying a maximum power spectral density in the area of interest and (2) identifying a power spectral density that surpasses a threshold power spectral density.

* * * * *